Jan. 17, 1967 R. L. STONE ETAL 3,298,220
THERMOCOUPLE FOR DTA
Filed May 15, 1964

Robert L. Stone
George T. Burress
INVENTORS

BY Arnold and Roylance

ATTORNEYS

United States Patent Office 3,298,220
Patented Jan. 17, 1967

3,298,220
THERMOCOUPLE FOR DTA
Robert L. Stone and George T. Burress, Austin, Tex., assignors, by mesne assignments, to Tracor, Inc., Austin, Tex., a corporation of Texas
Filed May 15, 1964, Ser. No. 367,692
24 Claims. (Cl. 73—15)

The invention relates to thermocouple constructions, and particularly concerns constructions of differential thermocouples which are particularly useful in differential thermal analysis.

Differential thermal analysis is basically a technique for observing changes in energy level of a sample substance as a function of temperature. The changes may be observed by providing a pair of thermocouples connected in opposing electrical relationship with electrical leads from their other ends, placing a sample substance near one of the thermocouples and a reference substance near the other, heating the sample substance and the reference substance at a programmed rate, and observing the differential voltage developed by the pair of thermocouples. The voltage differential developed is proportional to the changes in energy level of the sample substance different from the changes in energy level of the known or reference substance.

The differential voltage developed may be traced on a chart by conventional techniques to form a record of the differential voltage over the heating range. Usually a standard thermocouple is disposed near the differential thermocouples to indicate the actual temperature around the sample in order to plot on the chart the differential voltage against the actual temperature. The graphs obtained are characteristic of the sample substance with respect to the reference substance, and may be employed for identification purposes. The graphs are also useful in the determination of the characteristics of a known sample substance, such as melting point, vaporization point, temperature at which a change in crystalline structure occurs, and the like. If a reactive substance or a reactive atmosphere is placed around or sufficiently near the sample substance, the temperature of reaction can also be obtained by the above technique. Further, the magnitude of the differential voltage indicates the heat of reaction.

Although differential thermal analysis is basically a simple technique, there are many difficulties which must be overcome in order to obtain a clear, easily readable graph or chart representative of the characteristics of the sample substance. Obviously, the apparatus for the analysis should be very sensitive and able to detect and convey to the graph minute changes in energy level of the sample substance. The apparatus should be capable of good resolution between closely adjacent thermal loops on the graph in order for the graph to indicate and distinguish among complex series of reactions. The apparatus should also be capable of producing a portrayal of the changes in energy level without spurious loops or wiggles which obscure the actual changes. Drift from the base line representing the reference sample as well as the characteristics of the apparatus should also be minimized.

One of the difficulties involves the physical placement of a thermocouple near the sample or reference substance, since the thermocouple should be placed very close to the substance to obtain a temperature indication which is representative of the actual temperature in the substance. Of course, the thermocouple may be placed directly in the substance, but in commercial apparatus this arrangement has been found to be undesirable because the sample or reference substance may harm the thermocouple, for example, by reaction or fusion with it. Thus, it is preferable to provide a holder for the sample or reference substance which can be associated with the thermocouple in a manner providing good temperature indication, but which can be easily and inexpensively replaced when the holder is incapable of further use.

In accordance with the invention, a structure of a thermocouple is provided which in various embodiments may be employed advantageously in apparatus for differential analysis, but which may be employed if desired for any other uses to which thermocouples may be put. When employed in apparatus for differential analysis, a thermocouple in accordance with the invention can improve the overall performance of the apparatus by helping to improve sensitivity and resolution and to minimize drift. The thermocouple, however, does not normally contact a sample or reference substance directly, and thus is not subject to harmful reactions or fusion with the substance.

Broadly, a thermocouple in accordance with an invention, which is suitable for accepting a sample holder thereon, comprises a loop of sufficient diameter and sufficient closure to accept a sample holder thereon, a junction in the loop, whereby the junction is closely associated with a sample holder when accepted thereon, and electrical lead means associated with the junction. The loop may comprise a portion of a ring, preferably a portion larger than a semicircular portion, or the loop in some instances may be a completely closed ring. Likewise, the loop may be rectilinear in nature, such as in the form of a square or rectangle, or the loop may be designed to include both curved and rectilinear features, such as a hexagonal or octagonal shape.

A thermocouple as described above may be connected to a similar thermocouple to form a pair of differential thermocouples suitable for use in apparatus for analyzing a sample by differential thermal analysis. Of course, a pair of differential thermocouples in accordance with the invention may be employed for purposes other than differential thermal analysis if one so desires.

Figure 1:
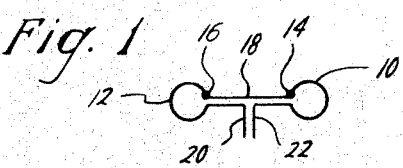
FIG. 1 is a schematic illustration of an embodiment of a differential thermocouple pair in accordance with the invention.

With reference to FIG. 1, the differential thermocouple pair shown schematically comprises a pair of loops 10 and 12 having junctions 14 and 16 on the loops 10 and 12 respectively with the junctions 14 and 16 connected by a wire 18. Wires 20 and 22 connect electrically to the other side of the junctions 14 and 16 to provide means for permitting measurement of a differential voltage developed by the junctions 14 and 16. The loops 10 and 12 may be made of wire of suitable size and cross section, and as shown are in the shape of an almost closed ring. The junctions 14 and 16 are preferably formed of platinum and an alloy of platinum and rhodium, such as an alloy of by weight about 90 percent platinum and 10 percent rhodium, but may be formed of iron and constantan, chromel and Alumel, or any other materials which when joined produce a thermoelectric effect.

The junctions 14 and 16 may be formed by making the wire 18 of a suitable material, making the loop 10 and the wire 22 of another suitable material as well as the loop 12 and the wire 20, and then fusing these parts together to form the structure shown in FIG. 1. Of course, other junctions may be formed in the structure, but the effect of additional junctions must be considered when analyzing the differential voltage developed across the wires 20 and 22. Thus, additional junctions are for most purposes undesirable.

Figure 2:
FIG. 2 is a schematic illustration of a sample holder positioned on a thermocouple in accordance with the invention.

In FIG. 2 a dish-shaped sample holder 24 is shown disposed on a wire 26 constituting a loop of a thermocouple with the junction (not shown) on the loop. As is apparent from FIG. 2, a reference or sample substance may be placed in the sample holder 24 without contacting the thermocouple itself, and if fusion or reaction occurs the holder 24 may be replaced with another for subsequent tests. The temperature of the substance in the sample holder 24, however, can be closely indicated by the junction in the loop since the junction can contact directly the sample holder 24. Of course, the sample holder 24 should be made of a good thermally conductive material, such as aluminum, inconel, copper, stainless steel, nickel, and the like. This combination of a thermocouple and a dish-shaped sample holder arranged and constructed in accordance with the principles described herein is particularly useful in differential thermal analysis.

Figure 3:
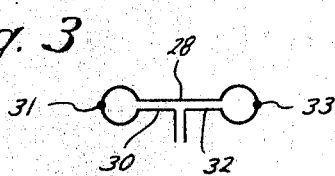
FIG. 3 is a schematic illustration of an embodiment of a differential thermocouple pair in accordance with the invention.

In FIG. 3 another embodiment in accordance with the invention is shown, which embodiment comprises a wire 28 having each of its ends formed in the shape of a semicircle, a wire 30 having one of its ends shaped in the form of a semicircle with this end fused to an end of the wire 28 to form a junction 31 as well as a loop, and a wire 32 having one of its ends shaped in the form of a semicircle with this end fused to the other end of the wire 28 to form a junction 33 as well as a loop. Of course, the wire 28 and the wires 30 and 32 should be made of dissimilar materials which provide thermoelectric junctions. Also, it will be obvious that each of the thermocouples can be constructed such that the junction can be located at any place around the loop.

Figure 4:
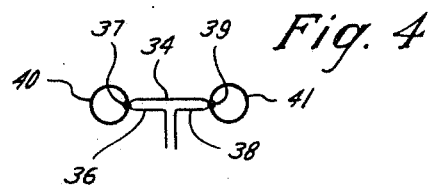
FIG. 4 is a schematic illustration of another embodiment of a differential thermocouple pair in accordance with the invention.

In FIG. 4 another embodiment is shown which comprises a wire 34, a wire 36 connected to one end of the wire 34 to form a junction 37, and a wire 38 connected to the other end of the wire 34 to form a junction 39. Loops 40 and 41 are preferably fused or connected to the junctions 37 and 39 in a manner which permits the junctions to form a part of the loops 40 and 41. The loops 40 and 41 may be made of any material which does not interfere with the thermoelectric effects of the junctions 37 and 39. For example, the loops 40 and 41 may be made of the same material as the wire 34 or the wires 36 and 38, or they may be made of another material.

Figure 5:
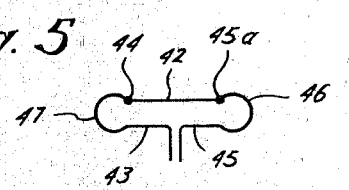
FIG. 5 is a schematic illustration of another embodiment of a differential thermocouple pair in accordance with the invention.

In FIG. 5 another embodiment is shown which comprises a wire 42, a wire 43 having one end shaped to constitute a portion of a ring larger than a semicircular portion with this end fused to one end of the wire 42 to form a junction 44, and a wire 45 having one end shaped to constitute a portion of a ring larger than a semicircular portion with this end fused to the wire 42 to form another junction 45a which is in electrical opposition with the junction 44. Since the main purpose of the loops 46 and 47 thus formed is to receive and hold sample holders in place, each of the loops 46 and 47 is preferably a portion of a ring larger than a semicircular portion. For some uses, however, especially when the loops are angled from horizontal to permit gravity to keep the holders in the loops 46 and 47, they may be a portion of a ring smaller than a semicircular portion.

Figure 6:
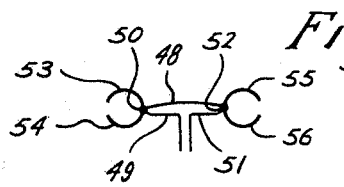
FIG. 6 is a schematic illustration of yet another embodiment of a differential thermocouple pair in accordance with the invention.

In FIG. 6 another embodiment of the invention is shown. This embodiment comprises a wire 48, a wire 49 having one end fused to an end of the wire 48 to form a junction 50, and a wire 51 having an end fused to the other end of the wire 48 to form a junction 52. Associated with the junction 50 is a pair of wires 53 and 54 which in combination with the junction 40 forms a portion of a ring. Associated with the junction 52 is a pair of wires 55 and 56 which in combination with the junction 52 forms a portion of another ring. The wires 53 and 54 and the wires 55 and 56 may be made of a material different from the wires 48, 49, and 51, or may be extensions of these wires.

Figure 7:
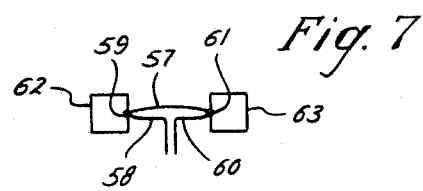
FIG. 7 is a schematic illustration of yet another embodiment of a differential thermocouple pair in accordance with the invention.

In FIG. 7 another embodiment of the invention is shown which comprises a wire 57, a wire 58 having one end fused to an end of the wire 57 to form a junction 59, and a wire 60 having one end fused to the other end of the wire 57 to form another junction 61 which is in electrical opposition to the junction 59. Loops 62 and 63 are associated with the junctions 59 and 61 respectively, and are rectilinear in shape. Of course, this embodiment will normally be employed when the sample holder or holders to be disposed thereon are shaped to conform with the loops 62 and 63. Likewise, the embodiments previously described may be rectilinear in form along a curved center line, such as a hexagonal or octagonal shape, especially when the sample holder to be disposed thereon is of a corresponding shape.

Figure 8:
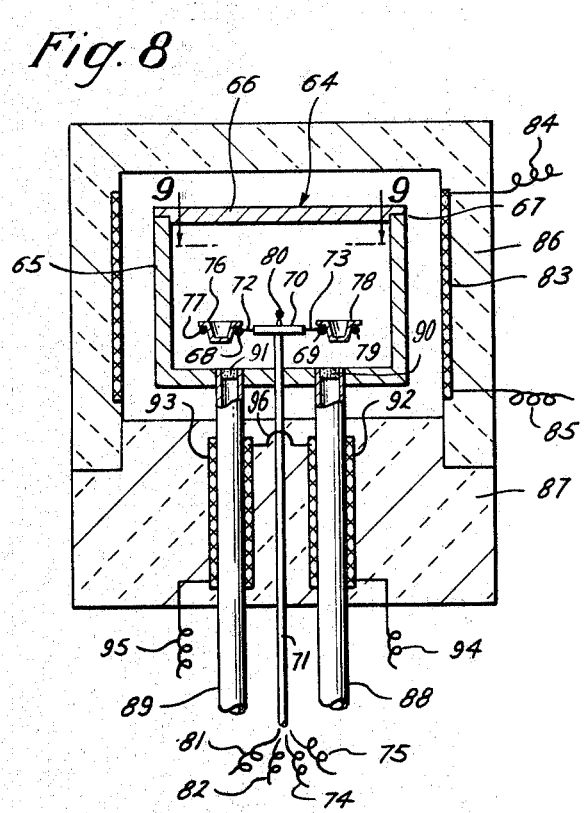
FIG. 8 is a partially sectional and partially schematic view of an assembly embodying the invention and suitable for use in apparatus for differential thermal analysis.

FIG. 8 is an illustration of an assembly for use in apparatus for analyzing a sample by differential thermal analysis, which assembly comprises as an improvement thereof an embodiment of a thermocouple in accordance with the invention. Broadly, the assembly comprises a sample holder block and a cap for the block, one of the block and the cap being cup-shaped and the other being shaped to fit over the open end of the one which is cup-shaped, thereby defining an interior space; a pair of thermocouples positioned in the interior of the enclosure away from the walls thereof, the thermocouples being electrically connected in opposing electrical relationship, and being adapted to be associated with a sample and reference material respectively; and electrical lead means associated with the thermocouples for permitting measurement of a differential voltage developed during analysis.

Particularly, the assembly comprises a sample holder enclosure 64 comprising a sample holder block 65 and a cap 66 fitting over the open end of the block 65. The block 65 is of cup-shaped configuration and as shown comprises a substantially cylindrical portion with a substantially flat portion closing the bottom end of the cylindrical portion. The cap 66 as shown is a disk shaped to fit over the block 65. The block 65 and cap 66 are preferably provided with mating lips, as shown at 67, to hold them in proper relationship.

Figure 9:
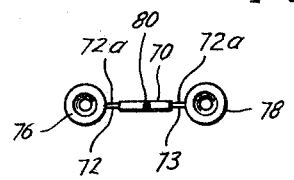
FIG. 9 is a view taken along the line 9—9 in FIG. 8.

With reference to both FIG. 8 and FIG. 9, a pair of differential thermocouples having junctions 68 and 69 are positioned in the interior of the enclosure 64 away from the walls thereof. In this regard, enclosure 64 may assume various configurations as long as the differential thermocouples are located away from direct contact with its walls and as long as substantially even heat transfer from its walls to the differential thermocouples therein is effected. Thus, the cap 66 and the block 65 in combination is preferably of a configuration which provides substantial symmetry around the thermocouples, although the configuration may be varied somewhat depending on the quality of results expected. For example, a cup-shaped cap with a substantially flat block, a hemispherical cap with a hemispherical block, or a cup-shaped cap fitting over and around a cup-shaped block can provide substantial symmetry around a pair of thermocouples disposed in the interior of the enclosure thus formed.

The junctions 68 and 69 are electrically connected by wire 72a in opposing electrical relationship with respect to voltage. Wires 72 and 73 from the junctions 68 and 69 pass into the electrically nonconductive tube 70 or other elongated member, into the electrically nonconductive tube 71 or other elongated member, and out of the assembly as electrical lead means 74 and 75. Thus, the differential voltage developed by the opposing junctions 68 and 69 can be read across the electrical lead means 74 and 75.

The electrically nonconductive tubes 70 and 71 are preferably also thermally nonconductive to minimize uneven heat distribution to the junctions 68 and 69, and the interior in general, from the walls of the enclosure 64. As used herein, the term "nonconductive" refers to a resistance of sufficient magnitude to accomplish the intended purpose, and obviously is not intended to refer to an infinite or perfect resistance.

The tubes 70 and 71 contain one or more ducts through which the wires 72a, 72, and 73 from the junctions 68 and 69 pass, and the ducts are referably positioned to provide sufficient electrical insulation between wires, although the wires themselves may be provided with insulation when the wires pass through a common duct.

The tubes 70 and 71 provide a means for positioning the thermocouples in the interior of the enclosure 64, although other suitable means may be employed. The nonconductive tube 71 may be held in place by either the block 65 or other suitable means, such as the body 87 of thermal insulation therebelow, taken with friction, adhesives, mechanical holding, and the like, and preferably carries and holds in place the nonconductive tube 70. The wires 72 and 73 passing through the tubes 70 and 71 may be employed to connect and hold the two tubes 70 and 71 together.

A reference sample holder 76 in the form of a shallow cup with an annular rim therearound is disposed on a loop 77 associated with the junction 68 as described hereinbefore, and a test sample holder 78 similar to the reference sample holder 76 is disposed on a loop 79 associated with the junction 69. The loops 77 and 79 and the sample holders 76 and 78 are preferably so shaped that the loops 77 and 79 hold the sample holders 76 and 78 in position against the junctions 68 and 69.

A standard thermocouple 80 is disposed near the junctions 68 and 69, and has electrical lead means 81 and 82 which pass from the thermocouple 80 through the nonconductive tube 70, through the nonconductive tube 71, and then out of the assembly. The electrical lead means 81 and 82 may be led from the interior of the enclosure 64 in a manner similar to that for the electrical lead means 74 and 75.

A heater 83 of any suitable design is disposed around or near the enclosure 64 and has electrical lead means 84 and 85. A cup-shaped body 86 of thermal insulation is disposed over the enclosure 64 and mates with another body 87 of thermal insulation. As shown, the heater 83 may be carried and held in place by the body 86 of thermal insulation. Of course, any furnace means may be employed to heat the enclosure 64 and its contents as long as it can perform satisfactorily.

Thus, when a test sample is placed in the test sample holder 78 and a reference sample is placed in the reference sample holder 76, and the heater 83 is energized to provide a programmed rate of heat increase in the interior of the enclosure 64, the test sample may be analyzed by differential thermal analysis by reading the differential voltage developed across the electrical lead means 74 and 75, and plotting the differential voltage against the actual temperature as represented by the voltage output across the electrical lead means 81 and 82 from the standard thermocouple 80.

To obtain a programmed rate of temperature increase in the enclosure 64 as measured by the thermocouple 80, the voltage output across electrical leads 81 and 82 may be employed to control a current source across the electrical leads 84 and 85 in accordance with known techniques. Of course, a lag in the indication by the standard thermocouple 80 must be considered in the design. Furthermore, the differential voltage across the electrical leads 74 and 75 may be first amplified by any suitable means and then led to a chart recorder for portrayal of the changes in energy level in the test sample, all if desired in accordance with known techniques.

The enclosure 64 preferably includes a gas inlet means for permitting the sample to be bathed in a gas of known composition during the differential thermal analysis. Such a gas can sweep away any gases evolved from the sample and thus maintain a known composition around the sample at all times. In addition, a dynamic or flowing gas around the sample also helps improve the resolution of the apparatus for differential thermal analysis. As shown in FIG. 8 the gas inlet means preferably is associated with the block 65 and comprises a pair of tubes 88 and 89 through which a gas may be introduced into the interior of the enclosure 64. The tubes 88 and 89 are preferably arranged to bathe the test sample as well as the reference sample sufficiently to keep a gas of relatively known composition therearound. The open ends of the tubes 88 and 89 in the enclosure 64 preferably include porous disks 90 and 91 through which the gas can flow, but which minimize turbulence in the atmosphere in the enclosure 64. The porous disks 90 and 91 may be made of any material which is sufficiently nonreactive under the conditions of analysis, for example, aluminum oxide, beryllium oxide, sintered nickel, other sintered metals, and the like. Gas entering through the gas inlet means may flow from the enclosure 64 through the junction between the block 65 and the cap 66, or by any suitable means provided in the enclosure 64. Nitrogen is a gas commonly employed, but other gases may be used depending of course on the results expected.

Preferably, heaters 92 and 93 are disposed around the gas inlet tubes 88 and 89 to preheat the gas before it enters the enclosure 64. As shown in FIG. 8 the heaters 92 and 93 have electrical leads 94 and 95 and are connected by a wire 96 so that a current may flow through the heaters 92 and 93 and heat the incoming gas. Of course, other suitable heating means may be employed.

The various parts described above may be made of any suitable material which serves the intended purpose. For example, the block, cap, sample holders, and gas inlet tubes may be made of aluminum, platinum, other noble metals, ceramics such as aluminum oxide, beryllium oxide, and magnesium oxide, stainless steel, inconel, copper, and the like depending on existing conductions. The thermally insulating materials may be any standard or other insulating materials, and the nonconductive tubes may be made of any suitable material or materials, for example, aluminum oxide, beryllium oxide, magnesium oxide, other ceramics, and the like. The thermocouples are preferably junctions of platinum and an alloy of by weight 90 percent platinum and 10 percent rhodium as described hereinbefore, but may be made of other suitable materials depending on conditions. The electrical leads may be made of any suitable electrically conductive material, and preferably are extensions of the materials forming the thermoelectric junctions to avoid the introduction of additional thermoelectric effects. The reference material is preferably aluminum oxide since it is substantially inert under the ordinary conditions of analysis and since its energy change with respect to change in temperature is substantially linear.

An assembly made by the above principles is also useful in apparatus for analyzing a sample with respect to pressure as well as temperature. Thus, if the apparatus contains a means for pressurizing the atmosphere around the sample, the effects of pressure on the changes in energy level can be measured in accordance with procedures described hereinbefore. This technique is a part of the expanding use of the analyzing method referred to generally as differential thermal analysis, and the constructions and procedures described herein are applicable in general to all of the variations in this method.

What is claimed is:

1. In apparatus for analyzing a sample by differential thermal analysis, a thermocouple suitable for accepting a sample holder thereon, said thermocouple comprising a loop of sufficient diameter and sufficient closure to accept a sample holder thereon, a junction in said loop, whereby said junction is closely associated with a sample holder when accepted thereon, and electrical lead means associated with said junction; and a sample holder shaped to hold a sample during analysis and shaped to sit on said loop and be supported thereby in close association with said junction during analysis.

2. The thermocouple defined in claim 1 wherein said loop is a loop of wire, and is a portion of a ring larger than a semicircular portion.

3. The thermocouple defined in claim 1 wherein said loop is a loop of wire, and is a completely closed ring.

4. The thermocouple defined in claim 1 wherein said loop is a loop of wire at least in part rectilinear.

5. A differential pair of thermocouples suitable for use in apparatus for analyzing a sample by differential thermal analysis, each of said thermocouples comprising a loop of sufficient diameter and sufficient closure to accept a sample holder thereon, a junction in said loop, whereby said junction is closely associated with a sample holder when accepted thereon, electrical lead means connecting said pair of thermocouples differentially, and electrical lead means associated with the junction in each of said thermocouples.

6. The differential pair of thermocouples defined in claim 5 wherein said loop is a loop of wire, and is a portion of a ring larger than a semicircular portion.

7. The differential thermocouple pair defined in claim 5 wherein said loop is a loop of wire, and is a completely closed ring.

8. The differential pair of thermocouples defined in claim 5 wherein said loop is a loop of wire at least in part rectilinear.

9. In apparatus for analyzing a sample by differential thermal analysis, the combination of a pair of dish-shaped sample holders and a differential pair of thermocouples adapted to receive and hold said sample holders thereon, each of said thermocouples comprising a loop of sufficient diameter and sufficient closure to accept a sample holder thereon, a junction in said loop, whereby said junction is closely associated with a sample holder when accepted thereon, electrical lead means connecting said pair of thermocouples differentially, and electrical lead means associated with the junction in each of said thermocouples for permitting measurement of the differential voltage developed during analysis.

10. The combination defined in claim 9 wherein said loop is a loop of wire, and is a portion of a ring larger than a semicircular portion.

11. The combination defined in claim 9 wherein said loop is a loop of wire, and is a completely closed ring.

12. The combination defined in claim 9 wherein said loop is a loop of wire at least in part rectilinear and each of said dish-shaped sample holders is shaped to sit thereon in close association with said junction.

13. In apparatus for analyzing a sample by differential thermal analysis, said apparatus comprising a sample holder enclosure comprising a sample holder block and a cap for said block, one of said cap and said block being cup-shaped and the other being shaped to fit over the open end of the one which is cup-shaped, thereby defining an interior space; a pair of thermocouples positioned in the interior of said enclosure away from the walls thereof, said thermocouples being electrically connected in opposing electrical relationship, and being adapted to be associated with a sample and a reference material respectively; and electrical lead means associated with said thermocouples for permitting measurement of a differential voltage developed during analysis; the improvement wherein said thermocouples each comprise a loop of sufficient diameter and sufficient closure to accept a sample holder thereon, and a junction in said loop, whereby said junction is closely associated with a sample holder when accepted thereon.

14. The improvement defined in claim 13 wherein said loop is a loop of wire, and is a portion of a ring larger than a semicircular portion.

15. The improvement defined in claim 13 wherein said loop is a loop of wire, and is a completely closed ring.

16. The improvement defined in claim 13 wherein said loop is a loop of wire at least in part rectilinear.

17. In apparatus for analyzing a sample by differential thermal analysis, said apparatus comprising a sample holder enclosure comprising a sample holder block and a cap for said block, one of said cap and said block being cup-shaped and the other being shaped to fit over the open end of the one which is cup-shaped, thereby defining an interior space; a pair of thermocouples positioned in the interior of the said enclosure away from the walls thereof, said thermocouples being electrically connected in opposing electrical relationship, and being adapted to be associated with a sample and a reference material respectively; and electrical lead means associated with said thermocouples for permitting measurement of a differential voltage developed during analysis; the improvement wherein a pair of dish-shaped sample holders are provided for holding said sample and said reference material respectively; and wherein said thermocouples each comprise a loop of sufficient diameter and sufficient closure to accept and hold one of said sample holders thereon, and a junction in said loop, whereby said junction is closely associated with one of said sample holders when accepted thereon.

18. The improvement defined in claim 17 wherein said loop is a loop of wire, and is a portion of a ring larger than a semicircular portion.

19. The improvement defined in claim 17 wherein said loop is a loop of wire, and is a completely closed ring.

20. The improvement defined in claim 17 wherein said loop is a loop of wire at least in part rectilinear and each of said dish-shaped sample holders is shaped to sit thereon in close association with said junction.

21. In apparatus for analyzing a sample by differential thermal analysis, a differential pair of thermocouples comprising a first wire, a second wire fused to said first wire to form a first junction, and a third wire fused to said first wire to form a second junction in electrical opposition to said first junction; at least one of said first and second wires forming adjacent said first junction a loop of wire of sufficient periphery to support a sample holder thereon in close association with said first junction; and a sample holder shaped to hold a sample and to sit on said loop and be supported thereby in close association with said first junction.

22. In the apparatus defined in claim 21, said first wire being disposed during operation of said apparatus substantially horizontally along its entire length between said first and second junctions.

23. In the apparatus defined in claim 21, said loop of wire being at least in part rectilinear.

24. In the apparatus defined in claim 21, said loop of wire forming a portion of a ring larger than a semicircular portion.

References Cited by the Examiner

UNITED STATES PATENTS

| | | | |
|---|---|---|---|
| 2,000,489 | 5/1935 | Lederer | 135—4.4 |
| 2,317,168 | 4/1943 | Ball | 136—4.4 |

(Other references on following page)

FOREIGN PATENTS 1,233,678  10/1960  France.

OTHER REFERENCES

Lloyd, S. J., et al.: "A Simple, Automatic, High-Temperature Thermal Analysis Apparatus," in Journal of Scientific Instruments 35(7), pages 252–254.

Bohn, R. L.: "DTA of Explosives and Propellants Under Controlled Atmospheres," in Analytical Chemistry, 33(10), pages 1451–1453, September 1961.

Mazieres, C.: "Micro and Semimicro Differential Thermal Analysis (DTA)," in Analytical Chemistry, 36(3), pages 602–605, March 1964.

JAMES J. GILL, *Primary Examiner*.

RICHARD C. QUEISSER, *Examiner*.

J. C. GOLDSTEIN, *Assistant Examiner*.